United States Patent [19]

Davis et al.

[11] Patent Number: 4,562,392
[45] Date of Patent: Dec. 31, 1985

[54] STYLUS TYPE TOUCH PROBE SYSTEM

[75] Inventors: Richard K. Davis, Charlottesville, Va.; William S. McKnight, Fairfield, Ohio

[73] Assignee: General Electric Company, Charlottesville, Va.

[21] Appl. No.: 645,273

[22] Filed: Aug. 29, 1984

[51] Int. Cl.$^4$ .............................................. G05B 19/24
[52] U.S. Cl. ................................... 318/572; 318/632; 318/39; 364/474; 82/14 D
[58] Field of Search ................. 318/632, 572, 39, 561; 82/14 D; 364/474

[56] References Cited

U.S. PATENT DOCUMENTS

| | | | |
|---|---|---|---|
| 3,605,531 | 9/1971 | Izum et al. | 318/572 X |
| 3,628,002 | 12/1971 | Meese | 318/572 X |
| 3,641,849 | 2/1972 | Kinney | 318/572 |
| 3,671,840 | 6/1972 | Meyer et al. | 318/39 X |
| 3,727,493 | 4/1973 | Lahn | 318/572 X |
| 3,935,766 | 2/1976 | Masters | 82/14 D |
| 4,195,250 | 3/1980 | Yamamoto | 318/632 X |
| 4,382,215 | 5/1983 | Barlow et al. | 318/572 X |
| 4,428,055 | 1/1984 | Zurbrick et al. | 318/572 X |

Primary Examiner—B. Dobeck
Attorney, Agent, or Firm—Ormand R. Austin

[57] ABSTRACT

A non-cutting tool or stylus (32), mounted in a position where a tool normally resides on a turret (26) of a numerically controlled machining system, rubs against the workpiece (41) as it rotates. The rubbing vibrations emanating from the workpiece (41) are picked up as a touch signal by an accelerometer (62) whose output signal is conditioned and fed to the numerical control (46). Diameter measurements, for example, are made directly by touching two opposing points on the workpiece (41) on opposite sides of the machine centerline (14) whereupon a difference calculation is made to provide the required diameter measurement.

8 Claims, 6 Drawing Figures

STYLUS TYPE TOUCH PROBE SYSTEM

CROSS REFERENCE TO RELATED APPLICATION

This application is related to a co-pending application Ser. No. 645,280, entitled, "Datum Reference For Tool Touch Probe System", which is assigned to the assignee of this invention.

BACKGROUND OF THE INVENTION

1. Field of the Invention

This invention relates generally to closed loop numerically controlled machining systems and more particularly to a touch probe system and gauging technique therefor.

2. Description of the Prior Art

The technology relating to automated precision machining is developing at a very rapid rate. Systems that are totally dependent on manual operations have largely given way to techniques whereby manufactured parts are made with general purpose, numerically controlled machine systems. Although cutting or other removal of material occurs automatically in such systems, numerous manual operations are still required, primarily for measuring the machined dimensions and for making cutter adjustments using an ordinary numerical control cutter offset. These manual measurements and adjustments of the cutting tool are necessary to take into account a large number of variables, such as: wear of the cutting tool; repositioning and/or replacement of the cutting tool; as well as dimensional changes of the cutting tool, of the workpiece and of the machining apparatus itself due to such factors as heating; deflection under load; etc.

By way of example, in a typical operation carried out with a numerically controlled (NC) machine tool such as a lathe, certain adjustments, e.g. tool offsets, must be manually implemented by the operator after the machine is set up for the manufacture of a particular workpiece or part. Prior to the start of machining the operator must advance the cutting tool to a tool setting surface and determine the tool position by manually measuring the space between the tool and the reference surface. This is normally done with a piece of shim material or the like, and such measurements then form the basis for manually making tool offsets. Where the lathe includes tool holding means such as a multiple tool turret, this operation must be carried out separately for each tool as well as for each of the axes of motion of the machine. Prior to making the final or finishing cut for a particular workpiece surface, the various dimensions of the semi-finished workpiece surface are measured by using a hand-held gauge. This enables the operator to determine the required offset of the cutting tool which is used for the finishing cut. After the finishing cut is made, the workpiece is again checked with the hand-held gauge in order to measure the conformance of the actual dimensions of the finished surface to the desired dimensions.

The manual operations described above are individually time consuming and take up a significant amount of the total time required to machine a particular workpiece to the desired dimensions. This serves to limit the manufacturing capacity of the machine tool. Considering present day costs of a lathe or a milling machine (machining center), any reduction of the capacity of the machine tool becomes a matter of economic significance. Further, all such manual operations further open the manufacturing process to human error.

As is generally recognized, the solution to the foregoing problems is to automate manual measurements and the manual adjustments of the cutting tool, e.g. by the use of a computer operated numerical control system. In such a system the computer may either be positioned remote from the numerical control unit, or it may be incorporated in the latter, e.g. in the form of a microcomputer. Alternatively, a computing capability may be provided remote from the numerical control unit as well as being incorporated into the latter. Instead of downloading successive blocks of data stored on tape or the like, as is the case in an ordinary NC system, a computer numerical control (CNC) system is capable of storing entire programs and calling them up in a desired sequence, editing the programs, e.g. by addition or deletion of blocks, and carrying out the computations of offsets and the like.

Although fully automatic systems have not been widely adopted at this stage of development of the precision machining field, a considerable amount of development work has been done to date, much of it limited to special purpose situations wherein a single machining operation is repetitively carried out. It is also known to mount a sensor in the form of a touch trigger probe on the bed of the machining apparatus, or on a pivotal arm that can be swung out of the way when desired. The position of the cutting tool can be calibrated against such a probe by noting the tool position when contact with the probe occurs. From the observed deviations between the programmed and the actual positions, a compensating offset may be determined and stored in the memory associated with the computer numerical control means. The offset compensates for the difference between the programmed contact position and the actual contact position.

A system and method which incorporates the features described above is disclosed in Allan R. Barlow and William A. Hunter U.S. Pat. No. 4,382,215, entitled, "System And Method Of Precision Machining", issued on May 3, 1983, and which is assigned to the assignee of the present application and incorporated herein by reference. As disclosed in this patent, a touch trigger probe known as a "Renishaw—3 Dimensional Touch Trigger Probe" is mounted in the tool holding means. The latter probe is first calibrated against datum or reference surfaces and is subsequently used to calibrate the tool sensor probe. Only then is the cutting edge of the selected tool calibrated by contact with the tool sensor probe. The initial tool offsets which are determined from the results of this operation are stored in numerical control means. After machining has taken place, the part sensor probe is again calibrated and is then used to probe the machined surface(s) of the workpiece. The information so obtained determines the final offsets required for the finishing cut. Subsequently, the finished surface may be probed to determine its conformance with the desired dimensions. Although simple in construction, the touch trigger probe must be specifically configured for a class of features to be probed. The probes themselves, which are normally purchased as commercial products from specific vendors, tend to be not only expensive but fragile and furthermore cannot reach all cuts.

Another example of touch probing is disclosed in T. Yamamato U.S. Pat. No. 4,195,250, entitled, "Automatic Measuring And Tool Position Compensating System For A Numerically Controlled Machine Tool", issued on Mar. 25, 1987. In this patent a stylus which moves under numerical control is alternately brought into contact with the workpiece. A digital type measuring system is utilized for generating a train of pulses for measurement of the amount of movement of the stylus. Pulse generation is initiated when a voltage level changes when the stylus contacts the workpiece and thus a train of pulses is started and stopped in response to the stylus contact with the workpiece providing a pulse count which is transformed into a measurement of the desired dimension. The overall system complexity is increased by the use of the apparatus employed in the system disclosed in U.S. Pat. No. 4,195,250, and therefore system reliability may be diminished with attendant adverse affects. The cost involved in its implementation is also a major factor.

Accordingly, it is an object of the present invention to provide an improvement in the gauging of machined parts.

It is a further object of the invention to provide an improvement in touch probe systems utilized in closed loop numerically controlled machining systems.

It is another object of the invention to provide a new and improved system for automatically precision machining a workpiece which utilizes apparatus that is relatively simple and economical in construction.

SUMMARY

Briefly, the foregoing and other objects are achieved by means of a non-cutting tool or stylus mounted upon the turret of a numerically controlled machining system such as a lathe. In its preferred form, the stylus comprises a precision carbide ball located at the end of a rod which is secured to a member similar to a tool holder. An accelerometer mounted on the turret picks up "rubbing" vibrations generated as the ball of the stylus rubs against the workpiece as it rotates. The output signals of the accelerometer are coupled to a signal conditioner by means of a rotating coupler where they are thereafter fed to the numerical control and utilized, for example, in measuring a diameter of a workpiece by bringing the stylus into two opposing touch points on either side of the machine tool's center-line and thereafter subtracting the two measurements in a well known fashion to provide the desired measurement. For a certain group of cuts where the stylus may inadvertently touch the side of the groove, a special shape stylus can be used.

BRIEF DESCRIPTION OF THE DRAWING

While the present invention is defined in the claims annexed to and forming a part of the specification, a better understanding can be had by reference to the following description when taken in conjunction with the accompanying drawings in which:

DESCRIPTION OF THE PREFERRED EMBODIMENT

Figure 1:
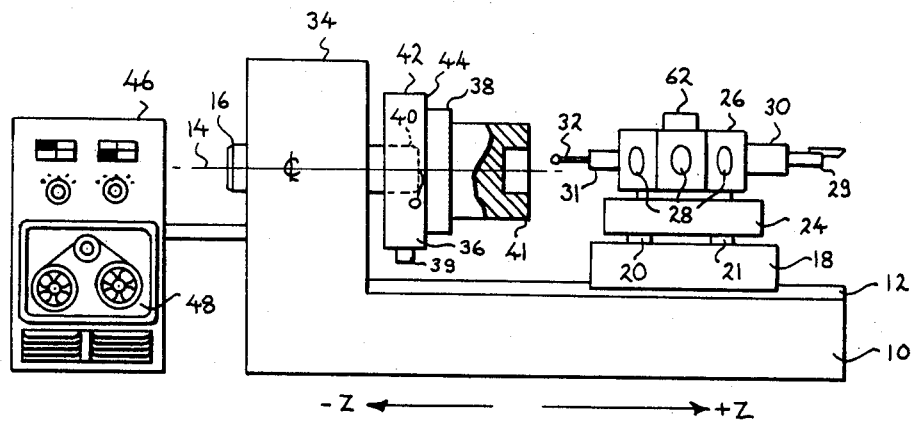
FIG. 1 is a simplified elevational view of a horizontal turret lathe incorporating the features of the subject invention.
Figure 2:
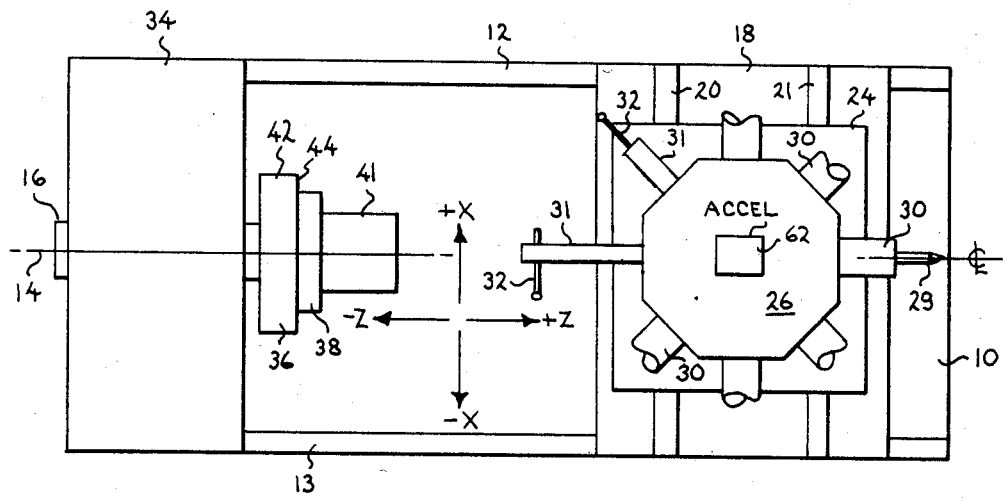
FIG. 2 is a simplified top plan view of the turret lathe shown in FIG. 1.

Referring now to the drawings and more particularly to FIGS. 1 and 2, shown thereat is a simplified illustration of a machining system in the form of a horizontal turret lathe. Typically a turret lathe operates along two mutually perpendicular axes, the X axis and Z axis, with the X axis being designated an axis across the bed of the machine, while the Z axis lies along the length of the bed. As shown, the bed of the lathe includes a frame 10 which carries a pair of guideways 12 and 13 which extend along the Z axis. Parallel to the Z axis is the center line or rotating axis 14 of a lathe spindle 16. A saddle or lateral slide 18 is slidably disposed on the guideways 12 and 13 and is capable of being bidirectionally positioned along the Z axis in either a forward (toward the workpiece, $-Z$) or reverse (away from the workpiece, $+Z$) direction. Positioning of the saddle 18 along the Z axis is carried out by means of a lead screw arrangement, not shown, which may be driven by a conventional DC positioning motor arrangement.

The saddle 18, moreover, carries a pair of laterally transverse ways 20 and 21 on which a cross slide 24 is slidably disposed so as to be capable of being positioned along the X axis. Positioning of the cross slide 24 in the X axis is likewise carried out by means of the lead screw arrangement which may be driven by a DC positioning motor. Each of the electric motors or lead screws may have a conventional resolver or encoder coupled thereto adapted to provide a feedback signal indicative of the rotary position of the corresponding component. These feedback signals are representative of the linear position of the saddle 18 and the cross slide 24 along their respective axes. Alternatively, suitable electronic or opto-electronic encoding devices may be used to provide signals directed representative of the linear position of the saddle 18 and the cross slide 24.

A turret 26 is carried by the cross slide 24 and includes a plurality of tool locations 28, each capable of mounting a tool holder or stylus type touch probe holder thereon. In the arrangement shown, the turret 26 is typically capable of mounting eight separate cutting tools or touch probes at tool locations 28. By appropriately indexing, i.e. rotating the turret 26, each tool or probe may be brought into operating position as shown in the drawing. In the embodiment shown in FIGS. 1 and 2, the turret is illustrated for the sake of simplicity in FIG. 2, as carrying a single tool holder 30 including a cutter tool 29 and two stylus holders 31 including two types of stylus probes 32 to be subsequently described.

The bed of the lathe illustrated in FIG. 1 further includes a spindle drive and gear box 34 which is located at one end thereof. The rotatable spindle 16 projects out of the drive and gear box assembly 34 and carries a chuck 36 which includes a set of jaws 38 for holding a workpiece 41. Spindle 16 additionally includes a spindle nose or face 40 which abuts chuck 36. The intersection of the plane of face 40 with the spindle axis or center line 14 defines the original "O" position or origin from which the manufacturer of the particular machine tool establishes machine element and cutting tool locating specifications for use in programming the system. While all program positions are referenced to the origin, the measuring system of the machine tool itself always counts or measures relative to a home position. The latter position is normally located as far away from the spindle nose and center line as saddle 18 and cross slide Z+ are able to move.

The chuck 36, in accordance with the known prior art, is configured to include a datum ring having at least a pair of position reference surfaces or datum surfaces which are perpendicular to the X and Z axes, respectively. Each of these surfaces is positioned at a known, calibrated distance from the origin or "O" position. As shown, the external cylindrical surface 42 of the chuck 36 constitutes one reference surface, while chuck face 44 provides the other reference surface. When desirable a special datum post 22 disclosed for example in the above referenced related application U.S. Ser. No. 645,280 may be utilized.

In FIG. 1 numerical control (NC) unit 46 is electrically coupled to a number of different components in the system such as the DC positioning motors, the resolvers, and the acoustic transducer, among other things. The numerical control 46 includes a tape transport 48 which is adapted to store the part and machine control for machining the workpiece. For example, the program may be used to: index the turret; to turn on the coolant required for machining; to rotate the spindle in a selected direction and at a selected speed; to move the probe or tool in a particular sequence of steps for calibration, measuring, for cutting purposes by positioning the saddle 18 and the cross slide 24; and for various other related purposes. The tape may also contain various data such as the desired dimensions of a particular surface which is to be machined as well as the allowable machining tolerance for each dimension and certain parameters which must be taken into consideration depending upon the part which is to be machined and the particular tool or tools to be used, etc.

The numerical control unit 46 may incorporate a computer, such as a microcomputer which responds to stored code words on tape. The microcomputer then causes the appropriate control signals to be issued, e.g. to the DC positioning motors, which will give effect to the tape commands. The microcomputer is also responsive for processing the data acquired through various probing operations and for computing offsets which may produce modifications of the cutting operations carried out by the machining program. All of these functions may be carried out, when desirable, in a remotely located computer, such as in a central computer of a distributed numerical control system so that the processed data is fed to unit 46 which then generates the appropriate control signals. In such an arrangement, the computing capability is normally retained in the numerical control 46.

The data received from the probing operations, feedback data from the resolvers, and data loaded in through the program itself is processed by the microcomputer to compute the aforesaid offsets. Motor control signals derived from the processed data are compared against the position feedback data received from the respective motor resolvers or from other position feedback means. A closed loop system is established in which the differential determined upon comparison of the two signals controls the position of the cutting edge of the tool or position of the measuring probe. The numerical control 46 may also be used to compute, display and print the physical dimensions of the workpiece as well as to compute deviations from the programmed values and display the appropriate allowed machining tolerances. In a preferred embodiment, the numerical control unit 46 is implemented in the form of apparatus which is commercially available from General Electric Company, under the designation Mark Century ® 2000 Computer Numerical Control. If a more comprehensive disclosure of the overall operation of the machining system shown in FIG. 1 and the software utilized is desired, one can refer to the above referenced Barlow, et al. patent, U.S. Pat. No. 4,382,215.

In the above referenced related application Ser. No. 645,280 entitled, "Datum Reference For Tool Touch Probe System", the cutting tool itself is utilized as a touch probe and as such is utilized for gauging by sensing contact with the rotating workpiece via an accelerometer vibration pick-up technique. While this system has been found to operate as intended, certain practitioners are reluctant to employ the tool touch probe technique because it is felt that one can still harm the workpiece if the tool is used for gauging.

Figure 4:
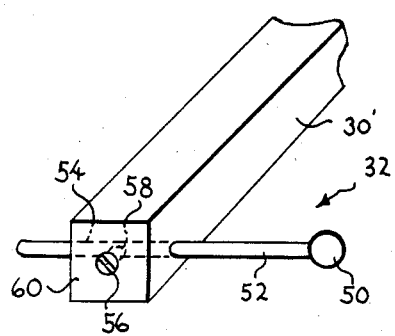
FIG. 4 is a partial perspective view of an embodiment of one type of stylus utilized on the turret shown in FIG. 2.
Figure 5:
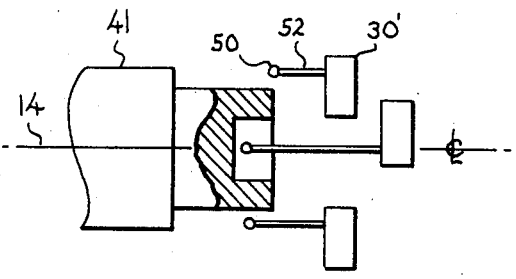
FIG. 5 is a simplified schematic illustration of the manner in which a diameter measurement is made in accordance with the subject invention.
Figure 3:
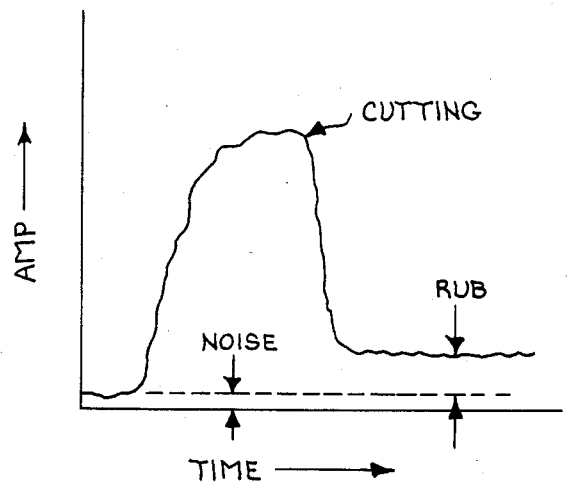
FIG. 3 is a characteristic curve helpful in understanding the operation of the present invention.

The present invention, on the other hand, provides a gauging technique which can be used to complement the above-mentioned tool gauging technique by utilizing a non-cutting tool in a location on a turret where a cutting tool normally resides. The non-cutting tool is adapted to merely rub against the workpiece as it rotates as opposed to cutting or gouging the workpiece. A distinction between the two kinds of contact can be detected due to the difference in amplitude and spectral characteristics as evidenced by the characteristic curve shown in FIG. 3. Referring briefly to FIG. 3, a relatively low amplitude noise level exists as random background noise whereas vibrations emanating from the workpiece as a result of the rubbing stylus comprises a relatively constant amplitude signal above the noise level whereas a cutting or gouging of the workpiece results in a relatively higher amplitude signal of varying amplitude. Accordingly, a non-cutting tool, preferably in the form of a stylus such as shown in FIG. 4, and comprising a precision carbide ball 50, having a diameter for example of 3/16 inches secured to the end of a 0.125 inch diameter metal rod 52, is mounted on a holder element 30' which is adapted to be fitted to one of the tool locations 28 shown in FIG. 1. Further as shown in FIG. 4, the rod 52 projects through a bore 54 in the side of the holder 30' and is held in place by means of a metal screw 56 placed in a threaded screw hole 58 formed in the end face 60. Such an arrangement is capable of making a "rubbing" touch against the workpiece 41 by being oriented transverse to the surface of the workpiece 41 or the center line 14 as shown in FIG. 5. When desirable, however, the rod and ball combination can be inserted into the end face 60 to provide a probe which is parallel to the machine center line 14. Both of these arrangements are shown in FIG. 2 being located in adjacent locations of the tool turret 26.

Figure 6:
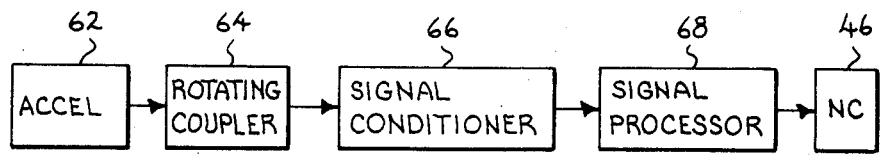
FIG. 6 is an electrical block diagram illustrative of the electrical signal path between the accelerometer mounted on the turret shown in FIGS. 1 and 2 and the numerical control means shown in FIG. 1.

Referring now to FIG. 6, the rubbing signal is picked up as a touch signal by an accelerometer 62 mounted on top of the tool turret and is coupled to the numerical control 46 through a rotating coupler 64, signal conditioning circuitry 66 and interface circuitry 68. Accelerometer 62 may be any one of a number of commercially available devices. For example, a Model No. 1018 accelerometer available from Vibra-Metrics has been found to perform satisfactorily in the present invention. The signal conditioning circuitry includes amplification and band pass filter means as well as discriminator means for eliminating spurious signals. The signal processor circuitry 68 provides an appropriate interface to the numerical control unit 46. It is to be noted that the accelerometer 62 need not be provided with any special coupling to the stylus 32. The accelerometer 62 is simply mounted on the turret 26 such that it picks up, through the turret 26, rubbing vibrations induced in the stylus 32 by contact with the rotating workpiece or datum surface. Furthermore in certain applications, particularly those involving a machining center other than a lathe, the stylus 62 may be rotating while the workpiece remains stationary. Rotation of the stylus 62 would, in that case, be analogous to use of a "line tool" as is well known. What is important is that there be relative motion between the stylus 62 and the contact surface so that "rubbing vibrations" are generated.

The apparatus involving the rubbing stylus type of probe mounted on the tool turret provides a means for making a direct measurement of a part diameter as opposed to being limited to a radius measurement. The inability to directly make diameter measurements is one of the severe drawbacks of known touch probing methods which make use of datum surfaces and a conventional cutting tool as a touch probe.

In measuring a diameter with the stylus type probe, the ball is brought into rubbing contact with the workpiece 40 on both sides of the center line 14 as shown by the phantom depiction in FIG. 5. When contact is made at each side of the workpiece the location of each contact (i.e., the surface of the workpiece) is established within the machine tool's coordinate system. The diameter measurement is then made by a well known subtraction technique for the two probe positions. The calculation is made in the numerical control unit 46. This is a more accurate technique than doubling a radius measurement because it does not require compensation of datum variation due to temperature. This position technique further does not require the cutting tool to be gauged for offset or provided with other means such as reference datum surfaces. The present invention nevertheless provides a machine tool gauging system which permits radius measurements if desired. For example, a radius (or other dimension) of the workpiece can be carried out by first bringing the stylus into contact with one of the datum surfaces (datum surface 42 for radius, datum surface 44 for length, for example) to establish a first position of the stylus surface. This amounts to a calibration of the stylus position since the datum surface location is precisely known within the machine's coordinate reference system. Once calibrated, the stylus is repositioned to touch the rotating workpiece at the point where the radius is to be determined. The stylus position at the point of contact is noted. By taking the difference between the two positions, the radius is determined. The accelerometer 62 (acoustic sensor) detects the rubbing contact at both positions of the probe via rubbing vibrations transmitted through the stylus.

While there has been shown and described what is at present considered to be the preferred embodiment of the invention, modifications thereto will readily occur to those skilled in the art. For example, for certain groove cuts, a special shaped stylus type of rubbing probe may be necessary. It is not desired, therefore, that the invention be limited to the specific implementation shown and described, but it is intended to cover all such modifications, alterations and changes falling within the spirit and scope of the invention as defined in the appended claims.

We claim:

1. Apparatus for gauging the dimensions of a workpiece mounted for machining in a machine tool, comprising:
    a stylus probe mounted in a tool holding mechanism of the machine tool, said stylus having a surface for contacting other surfaces within a coordinate reference system of the machine tool;
    means for controlling the position of the tool holding mechanism within the coordinate reference system and providing signals indicative of such position;
    a sensor mounted for sensing vibrations induced in said stylus for providing contact indicative signals whenever said mechanism is positioned to cause contact between the surface of said stylus probe and other surfaces within the coordinate reference system, there being relative motion between the stylus surface and such other surfaces; and
    means for receiving said position indicative signals and said contact indicative signals to determine the relative position of such other surfaces within the coordinate reference system, the relative position of surfaces upon the workpiece being indicative of the workpiece dimensions.

2. The apparatus of claim 1 wherein said sensor comprises an accelerometer.

3. The apparatus of claim 2 wherein said stylus probe comprises an elongated rod adapted at one end for mounting in said tool holding mechanism and having at its other end a spherical ball whose outer surface provides the surface for contacting other surfaces within the coordinate reference system.

4. A method for determining the dimensions of a workpiece mounted for machining in a machine tool, comprising the steps of:
    (a) mounting a stylus probe in a tool holding position of the machine tool;
    (b) moving the mounted stylus probe to effect contact between the stylus and a point on a first surface located within a coordinate reference system of the machine tool to establish a first position of the stylus within the reference system, there being relative motion between the stylus and the first surface so that contact is detected by rubbing vibrations transmitted through said stylus;
    (c) moving the mounted stylus probe to effect contact between the stylus and a point on the workpiece surface at which a dimension of the workpiece is to be determined, to establish a second position of the stylus within the coordinate reference system, there being relative motion between the stylus and the workpiece so that contact is detected as in step (b);
    (d) comparing the first and second positions of the stylus to establish a dimension of the workpiece at said position on the workpiece.

5. The method of claim 4 wherein said first surface is a datum surface having a known, fixed location within the coordinate reference system.

6. The method of claim 5 wherein said first surface is at a point on the workpiece other than the point of step (c) and the comparison between first and second positions establishes the dimension of the workpiece between such points.

7. The method of claim 6 wherein the relative motion of steps (b) and (c) occurs as a result of workpiece rotation about an axis.

8. The method of claim 6 wherein the workpiece remains stationary within the coordinate reference system and the stylus probe is caused to rotate.

* * * * *